US007137692B2

(12) United States Patent
Sonnichsen et al.

(10) Patent No.: US 7,137,692 B2

(45) Date of Patent: Nov. 21, 2006

(54) INK JET APPARATUS

(75) Inventors: Brian E. Sonnichsen, Portland, OR (US); Daniel L. Stoneman, Portland, OR (US)

(73) Assignee: Xerox Corporation, Stamford, CT (US)

( * ) Notice: Subject to any disclaimer, the term of this patent is extended or adjusted under 35 U.S.C. 154(b) by 348 days.

(21) Appl. No.: 10/888,710

(22) Filed: Jul. 8, 2004

(65) Prior Publication Data

US 2006/0007281 A1 Jan. 12, 2006

(51) Int. Cl.
*B41J 2/175* (2006.01)
*G01D 11/00* (2006.01)

(52) U.S. Cl. ............................ 347/88; 347/85; 347/99

(58) Field of Classification Search ................. 347/88, 347/99, 84, 85, 86, 87, 93
See application file for complete search history.

(56) References Cited

U.S. PATENT DOCUMENTS

| | | | | |
|---|---|---|---|---|
| 5,781,212 | A * | 7/1998 | Burr et al. | 347/84 |
| 6,086,194 | A * | 7/2000 | Ikezaki | 347/88 |
| 6,224,194 | B1 | 5/2001 | Kohno et al. | 347/56 |
| 2002/0180852 | A1* | 12/2002 | Jones et al. | 347/88 |

* cited by examiner

*Primary Examiner*—Stephen Meier
*Assistant Examiner*—Leonard Liang
(74) *Attorney, Agent, or Firm*—Manuel Quiogue

(57) ABSTRACT

A fluid reservoir apparatus including first and second opposing thermally conductive walls, an elastomeric heater compressed between the first and second opposing thermally conductive walls, wherein the elastomeric heater has an uncompressed thickness that is greater than a distance between the first and second opposing thermally conductive walls, and a reservoir adjacent the first opposing thermally conductive wall and thermally coupled to first thermally conductive wall.

20 Claims, 7 Drawing Sheets

INK JET APPARATUS

BACKGROUND

The subject disclosure is generally directed to drop jetting apparatus such as ink jet printing.

Drop on demand ink jet technology for producing printed media has been employed in commercial products such as printers, plotters, and facsimile machines. Generally, an ink jet image is formed by selective placement on a receiver surface of ink drops emitted by a plurality of drop generators implemented in a printhead or a printhead assembly. For example, the printhead assembly and the receiver surface are caused to move relative to each other, and drop generators are controlled to emit drops at appropriate times, for example by an appropriate controller. The receiver surface can be a transfer surface or a print medium such as paper. In the case of a transfer surface, the image printed thereon is subsequently transferred to an output print medium such as paper. Some ink jet printheads employ melted solid ink.

DETAILED DESCRIPTION

Figure 1:
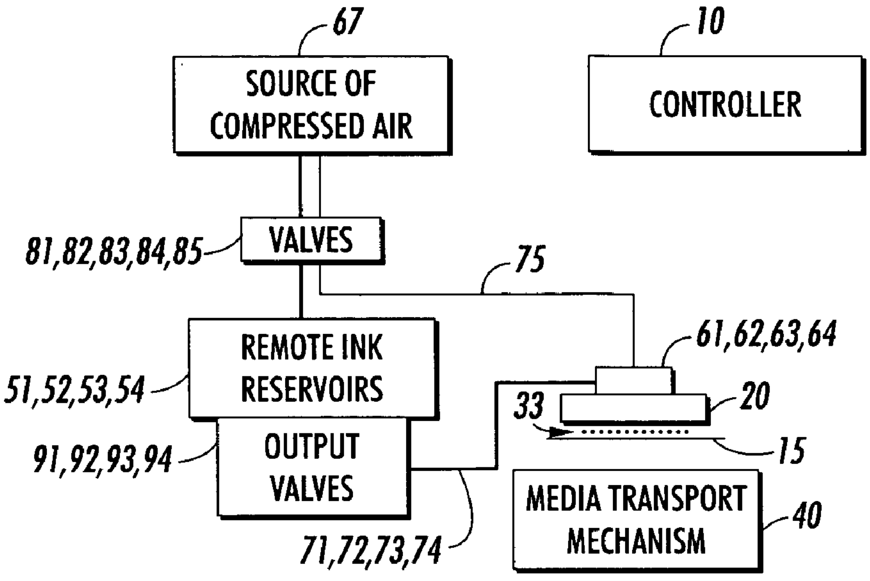
FIG. 1 is a schematic block diagram of an embodiment of an ink jet printing apparatus that includes remote ink reservoirs.
Figure 3:
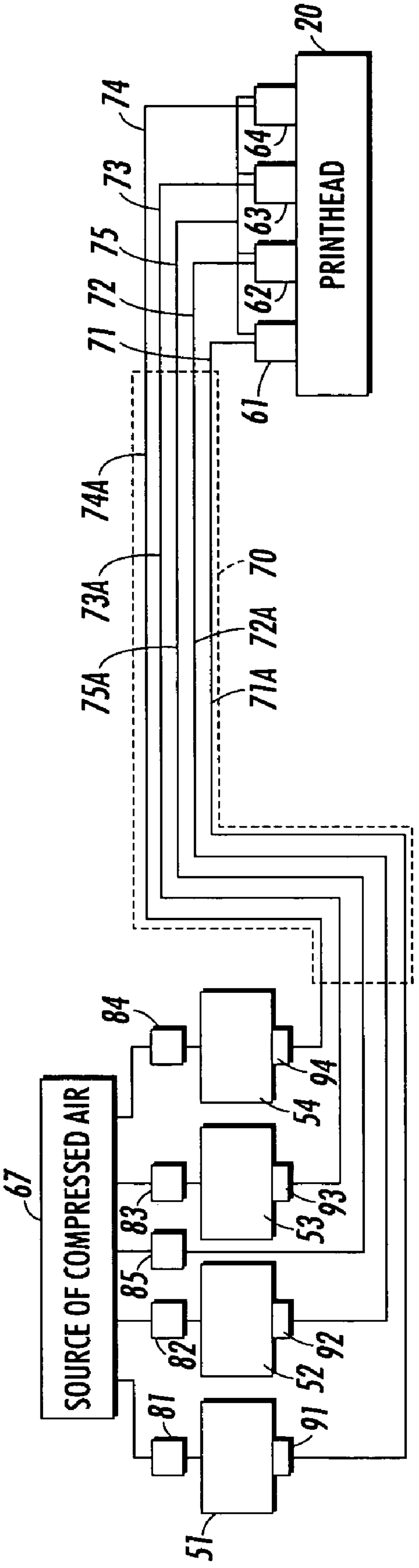
FIG. 3 is a schematic block diagram of an embodiment of ink delivery components of the ink jet printing apparatus of FIGS. 1 and 2.
Figure 4:
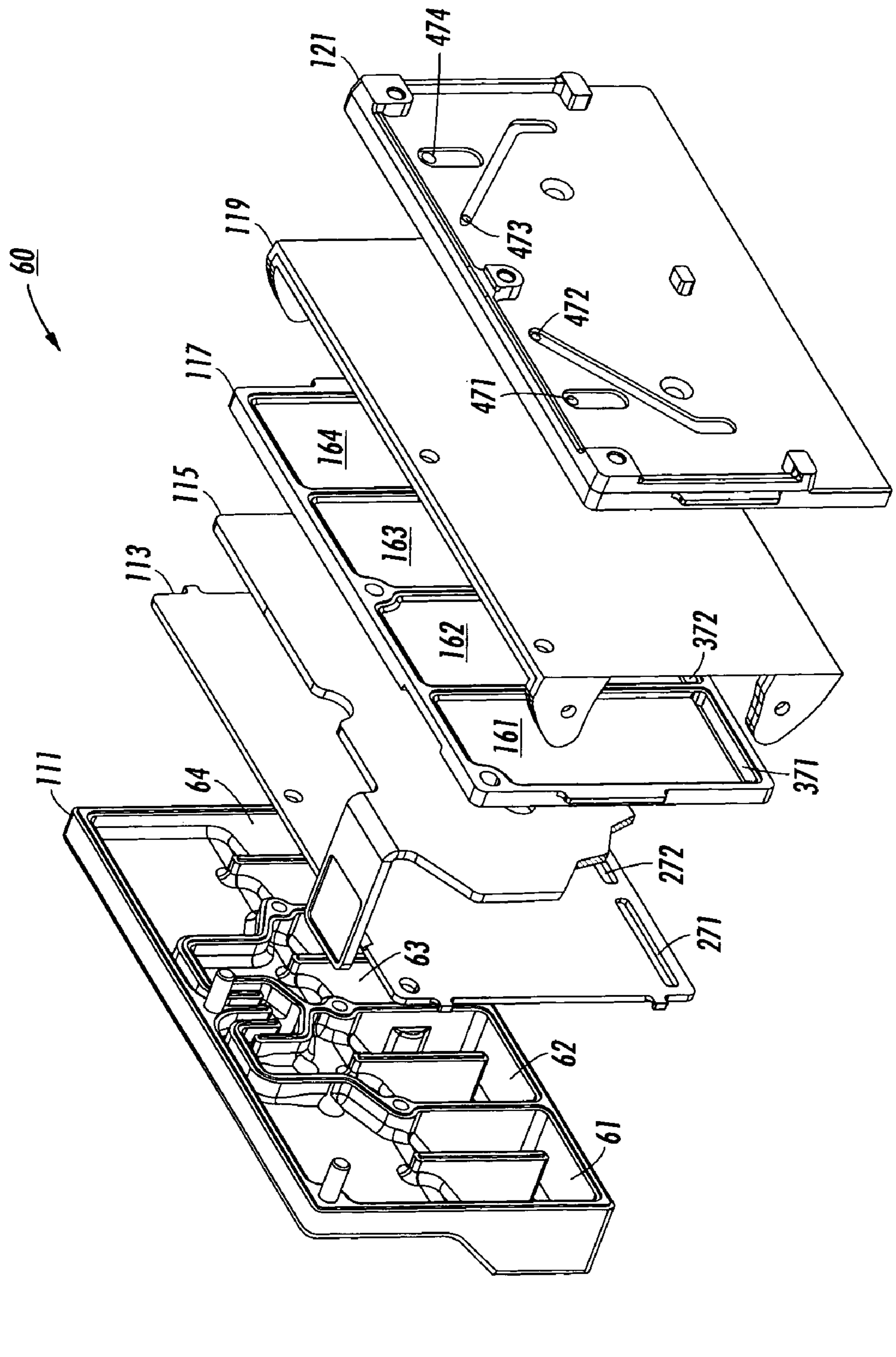
FIG. 4 and FIG. 5 are schematic front and back assembly illustrations of an embodiment of an ink reservoir.
Figure 5:
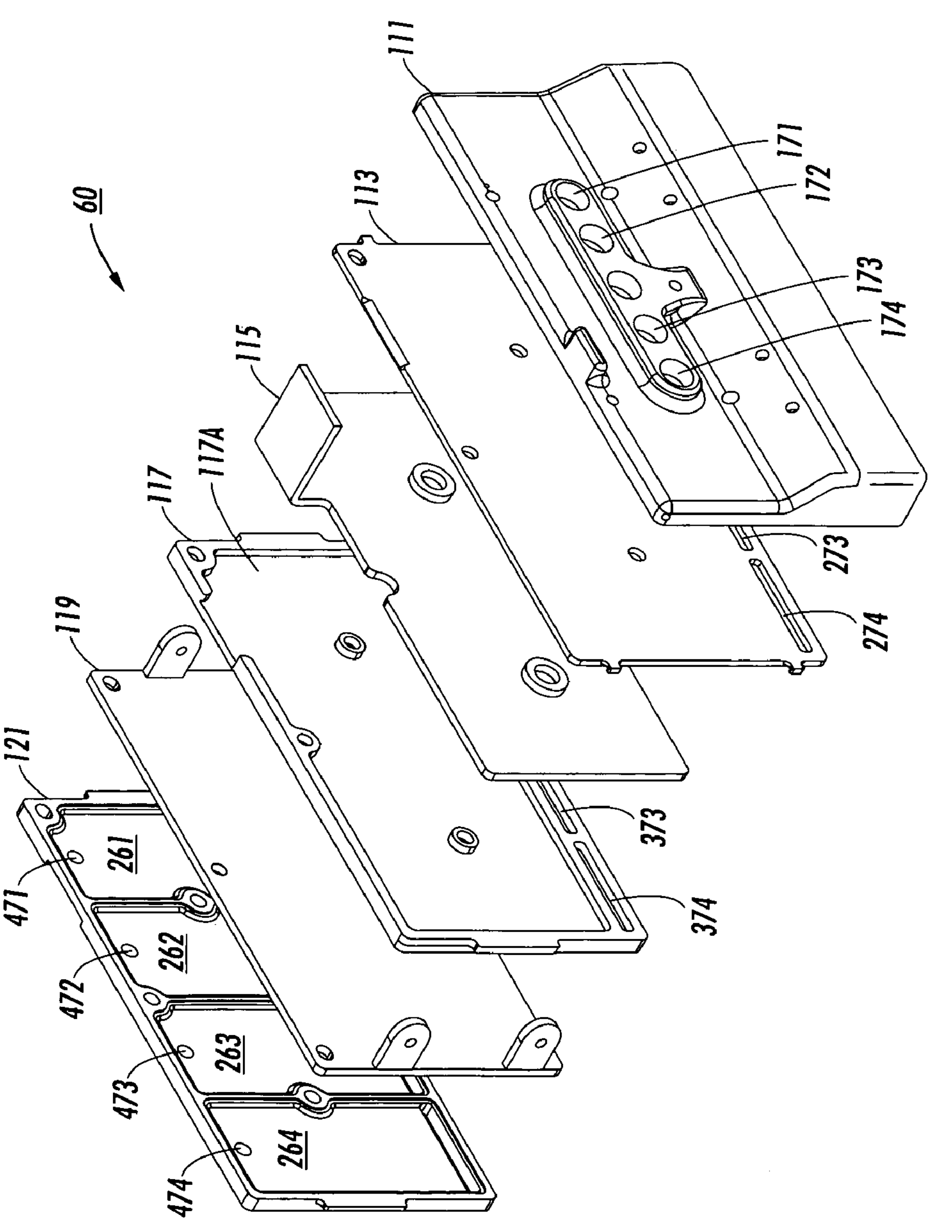

FIGS. 1 and 3 are schematic block diagrams of an embodiment of an ink jet printing apparatus that includes a controller 10 and a printhead 20 that can include a plurality of drop emitting drop generators for emitting drops of ink 33 onto a print output medium 15. A print output medium transport mechanism 40 can move the print output medium relative to the printhead 20. The printhead 20 receives ink from a plurality of on-board ink reservoirs 61, 62, 63, 64 which are attached to the printhead 20. The on-board ink reservoirs 61–64 respectively receive ink from a plurality of remote ink containers 51, 52, 53, 54 via respective ink supply channels 71, 72, 73, 74. The remote ink containers 51–54 can be selectively pressurized, for example by compressed air that is provided by a source of compressed air 67 via a plurality of valves 81, 82, 83, 84. The flow of ink from the remote containers 51–54 to the on-board reservoirs 61–64 can be under pressure or by gravity, for example. Output valves 91, 92, 93, 94 can be provided to control the flow of ink to the on-board ink reservoirs 61–64.

The on-board ink reservoirs 61–64 can also be selectively pressurized, for example by selectively pressurizing the remote ink containers 51–54 and pressurizing an air channel 75 via a valve 85. Alternatively, the ink supply channels

71–74 can be closed, for example by closing the output valves 91–94, and the air channel 75 can be pressurized. The on-board ink reservoirs 61–64 can be pressurized to perform a cleaning or purging operation on the printhead 20, for example. The on-board ink reservoirs 61–64 and the remote ink containers 51–54 can be configured to contain melted solid ink and can be heated. The ink supply channels 71–74 and the air channel 75 can also be heated.

The on-board ink reservoirs 61–64 are vented to atmosphere during normal printing operation, for example by controlling the valve 85 to vent the air channel 75 to atmosphere. The on-board ink reservoirs 61–64 can also be vented to atmosphere during non-pressurizing transfer of ink from the remote ink containers 51–54 (i.e., when ink is transferred without pressurizing the on-board ink reservoirs 61–64).

Figure 2:
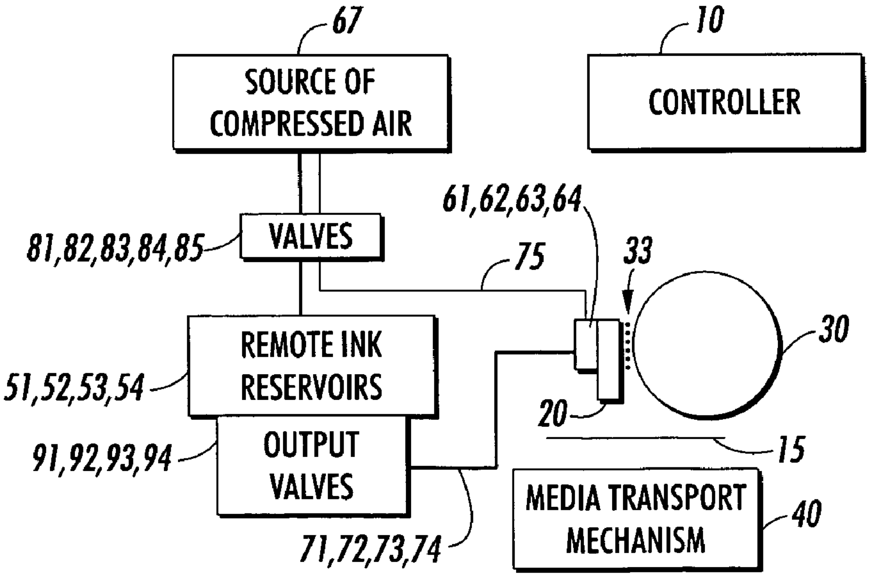
FIG. 2 is a schematic block diagram of another embodiment of an ink jet printing apparatus that includes remote ink reservoirs.

FIG. 2 is a schematic block diagram of an embodiment of an ink jet printing apparatus that is similar to the embodiment of FIG. 1, and includes a transfer drum 30 for receiving the drops emitted by the printhead 20. A print output media transport mechanism 40 rollingly engages an output print medium 15 against the transfer drum 30 to cause the image printed on the transfer drum to be transferred to the print output medium 15.

As schematically depicted in FIG. 3, a portion of the ink supply channels 71–74 and the air channel 75 can be implemented as conduits 71A, 72A, 73A, 74A, 75A in a multi-conduit cable 70.

FIGS. 4–7 schematically illustrate an embodiment of a reservoir assembly 60 that can implement the on-board reservoirs 61, 62, 63, 64. The reservoir assembly generally includes a rear panel 111 and a front panel 121. Located between the rear panel 111 and the front panel 121 are a first thermally conductive heater plate 113, an elastomeric heater sheet or panel 115, a second thermally conductive heater plate 117, and a filter assembly 119.

The rear panel 111 includes chambers that together with the first thermally conductive heater plate 113 form reservoirs 61, 62, 63, 64 that respectively receive ink via respective ports 171, 172, 173, 174 that are respectively connected to the supply channels 71, 72, 73, 74.

Figure 6:
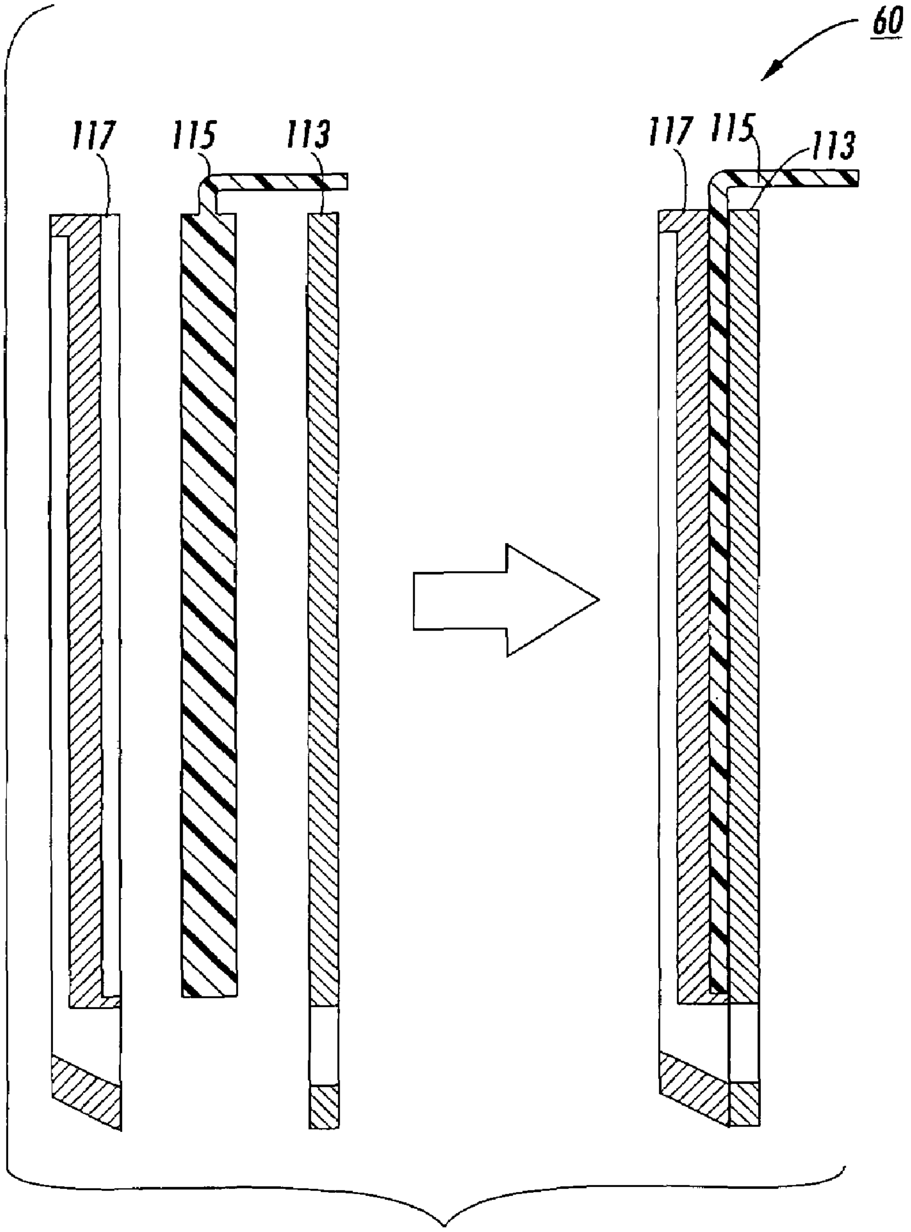
FIG. 6 schematically illustrates a heater sheet of the ink reservoir of FIGS. 4 and 5 having a thickness that is greater than the distance between opposing heater walls that compress the heater.

The second heater plate 117 can include a recess 117A (FIG. 5) for locating the elastomeric heater panel 115 which is compressed between opposing walls of the first and second thermally conductive heater plates 113, 117, and has a uncompressed thickness that is greater than the distance in the recess 117A between the opposing walls of the heater plates 113, 117, as schematically depicted in FIG. 6. In this manner, the contact between the elastomeric heater panel 115 and the first and second heater walls 113, 117 can be optimal. By way of illustrative example, the elastomeric heater sheet or panel 115 can comprise a silicone heater. By way of illustrative example, the elastomeric heater is compressed into a cavity formed by the recess 117A and the adjacent wall of the first heater plate 113.

The second heater plate 117 can further include filter input recesses or cavities 161, 162, 163, 164 (FIG. 4) that are fluidically connected to respective reservoirs 61, 62, 63, 64 by slots or channels 271, 272, 273, 274 formed in the first heater wall 113 and slots or channels 371, 372, 373, 374 formed in the second heater plate 117, for example along corresponding edges thereof.

The front plate 121 includes output filter recesses or cavities 261, 262, 263, 264 (FIG. 5) that are respectively opposite the cavities 161, 162, 163, 164 in the second heater plate 115 and fluidically coupled thereto by the filter assembly 119.

Figure 7:
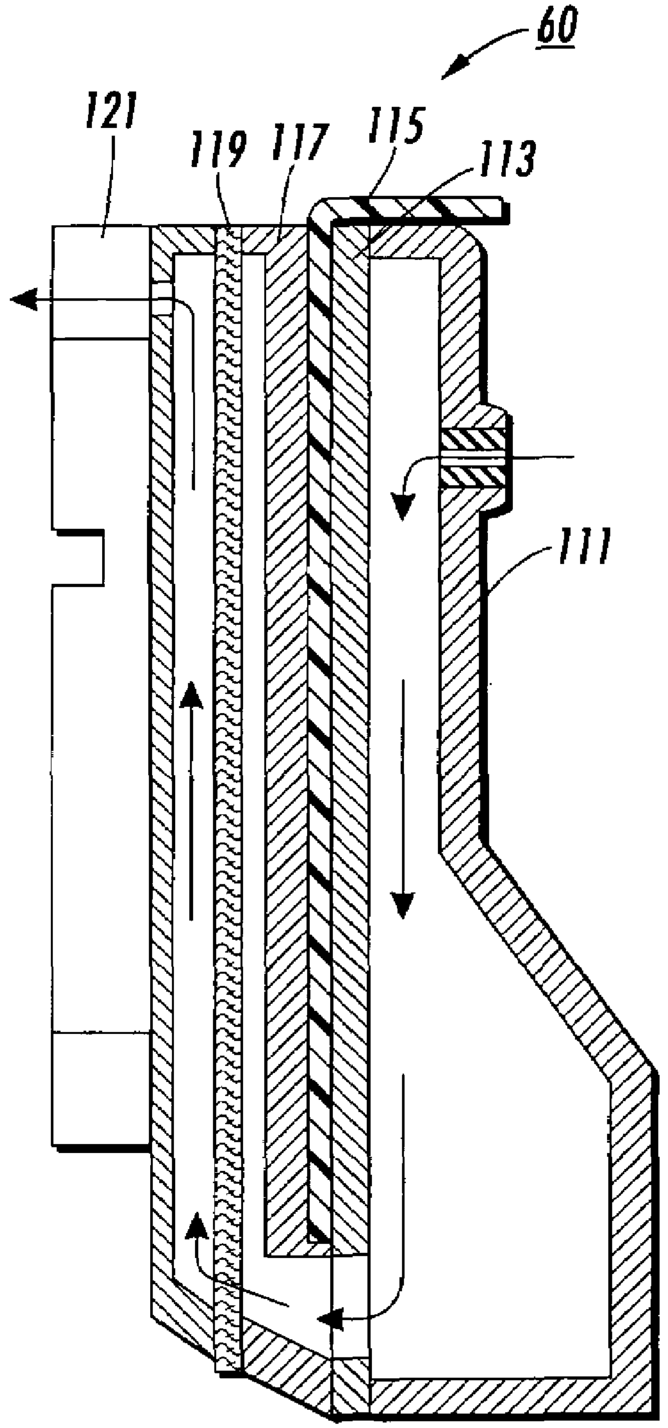
FIG. 7 is a schematic elevational sectional view of the ink reservoir of FIGS. 4 and 5.

As generally schematically depicted in FIG. 7, ink flows from the reservoirs 61, 62, 63, 64 through the channels 271, 272, 273, 274 and the channels 371, 372, 373, 374 to the input filter cavities 161, 162, 163, 164. The ink then flows from the input filter cavities 161, 162, 163, 164 through the filter assembly 113 to the output filter cavities 261, 262, 263, 264. Filtered ink flows to the printhead 20 (FIGS. 1–3) via output ports 471, 472, 474, 474 (FIG. 4) in the front plate 121.

By way of illustrative example, the back plate 111, the first heater plate 113, the second heater plate 117, the filter assembly 119, and the front plate 121 can comprise thermally conductive material such as stainless steel or aluminum, such that all of such plates are thermally coupled to elastomeric heater sheet or panel 115. The reservoirs 61, 62, 63, 64, the filter intput cavities 161, 162, 163, 164, and the filter output cavities are also thermally coupled to the elastomeric heater 115.

Figure 8:
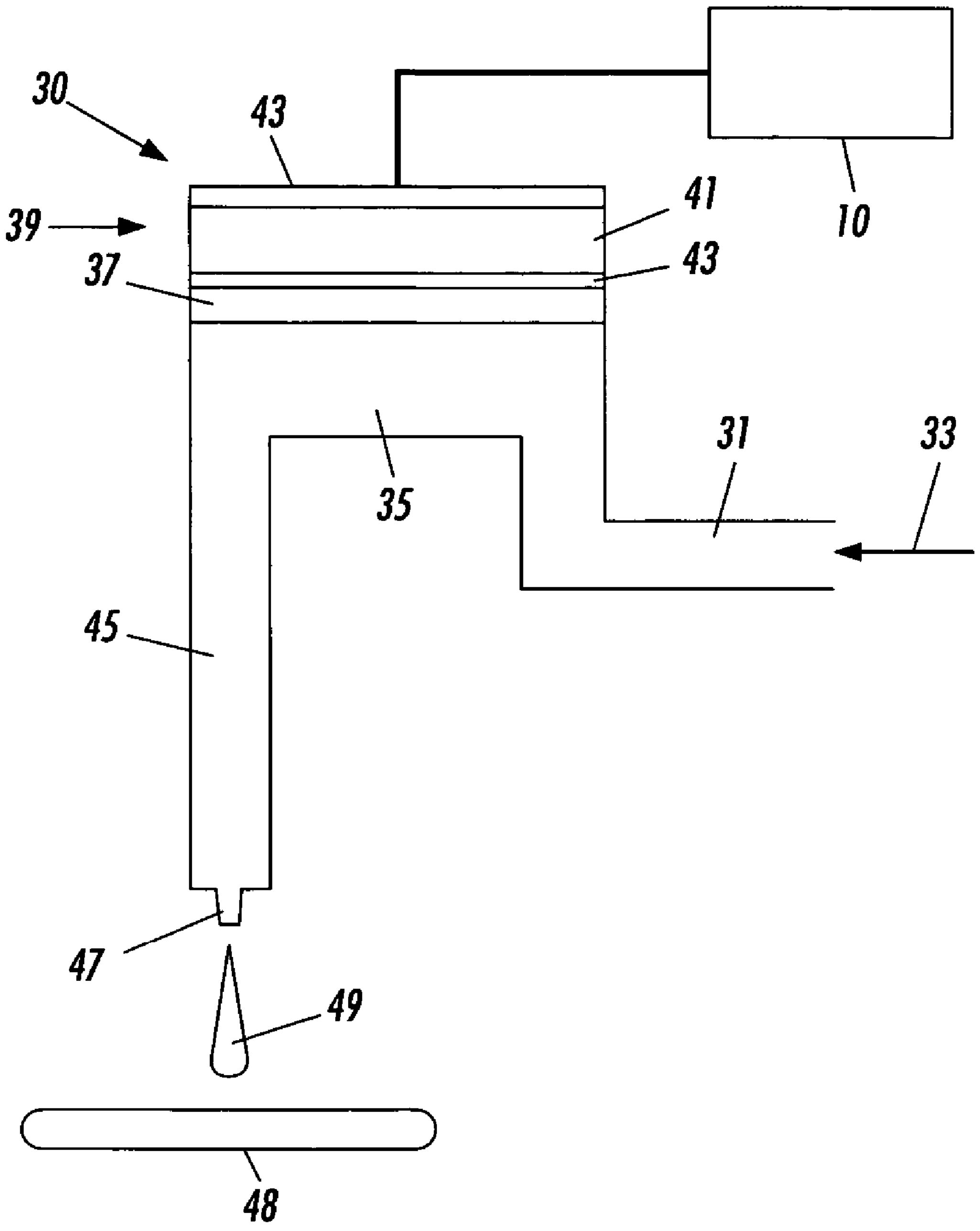
FIG. 8 is a schematic block diagram of an embodiment of a drop generator that can be employed in the printhead of the ink jet printing apparatus of FIG. 1 and in the printhead of the ink jet printing apparatus of FIG. 2.

FIG. 8 is a schematic block diagram of an embodiment of a drop generator 30 that can be employed in the printhead 20 of the printing apparatus shown in FIG. 1 and the printing apparatus shown in FIG. 2. The drop generator 30 includes an inlet channel 31 that receives melted solid ink 33 from a manifold, reservoir or other ink containing structure. The melted ink 33 flows into a pressure or pump chamber 35 that is bounded on one side, for example, by a flexible diaphragm 37. An electromechanical transducer 39 is attached to the flexible diaphragm 37 and can overlie the pressure chamber 35, for example. The electromechanical transducer 39 can be a piezoelectric transducer that includes a piezo element 41 disposed for example between electrodes 43 that receive drop firing and non-firing signals from the controller 10. Actuation of the electromechanical transducer 39 causes ink to flow from the pressure chamber 35 to a drop forming outlet channel 45, from which an ink drop 49 is emitted toward a receiver medium 48 that can be a transfer surface or a print output medium, for example. The outlet channel 45 can include a nozzle or orifice 47.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A fluid reservoir apparatus comprising:

first and second opposing thermally conductive walls;

an elastomeric heater compressed between the first and second opposing thermally conductive walls, wherein the elastomeric heater has an uncompressed thickness that is greater than a distance between the first and second opposing thermally conductive walls; and a reservoir adjacent the first opposing thermally conductive wall and thermally coupled to first thermally conductive wall.

2. The fluid reservoir apparatus of claim 1 wherein the reservoir receives melted solid ink.

3. The fluid reservoir apparatus of claim 1 wherein the first and second opposing thermally conductive walls comprise first and second opposing aluminum walls.

4. The fluid reservoir apparatus of claim 1 wherein the elastomeric heater comprises a silicone heater.

5. A fluid reservoir apparatus comprising:

first and second opposing thermally conductive walls;

an elastomeric heater compressed between the first and second opposing thermally conductive walls, wherein the elastomeric heater has an uncompressed thickness that is greater than a distance between the first and second opposing thermally conductive walls;

a reservoir adjacent the first opposing thermally conductive wall and thermally coupled to first thermally conductive wall; and a cavity adjacent the second opposing thermally conductive wall and thermally coupled to the second thermally conductive wall, wherein the cavity is fluidically coupled to the reservoir.

6. The fluid reservoir apparatus of claim 5 wherein the reservoir receives melted solid ink.

7. The fluid reservoir apparatus of claim 5 wherein the first and second opposing thermally conductive walls comprise first and second opposing aluminum walls.

8. The fluid reservoir apparatus of claim 5 wherein the elastomeric heater comprises a silicone heater.

9. A drop emitting apparatus comprising:

first and second opposing thermally conductive walls;

an elastomeric heater compressed between the first and second opposing thermally conductive walls, wherein the elastomeric heater has an uncompressed thickness that is greater than a distance between the first and second opposing thermally conductive walls;

a reservoir adjacent the first opposing thermally conductive wall and thermally coupled to the first thermally conductive wall;

a cavity adjacent the second opposing thermally conductive wall and thermally coupled to the second thermally conductive wall, wherein the cavity is fluidically coupled to the reservoir; and a plurality of drop generators fluidically coupled to the cavity.

10. The drop emitting apparatus of claim 9 wherein the drop generators comprise piezoelectric drop generators.

11. The drop emitting apparatus of claim 9 wherein the reservoir receives melted solid ink.

12. The drop emitting apparatus of claim 9 wherein the first and second opposing thermally conductive Walls comprise first and second opposing aluminum walls.

13. The drop emitting apparatus of claim 9 wherein the elastomeric heater comprises a silicone heater.

14. The drop emitting apparatus of claim 9 wherein the plurality of drop generators are implemented in a laminar stack of metal plates.

15. A drop emitting apparatus comprising:

a fluid reservoir assembly including an elastomeric heater compressed between opposing thermally conductive walls, wherein the elastomeric heater has an uncompressed thickness that is greater than a distance between the opposing thermally conductive walls; and a plurality of drop generators fluidically coupled to the ink delivery portion.

16. The drop emitting apparatus of claim 15 wherein the drop generators comprise piezoelectric drop generators.

17. The drop emitting apparatus of claim 15 wherein the reservoir assembly receives melted solid ink.

18. The drop emitting apparatus of claim 15 wherein the first and second opposing thermally conductive walls comprise first and second opposing aluminum walls.

19. The drop emitting apparatus of claim 15 wherein the elastomeric heater comprises a silicone heater.

20. The drop emitting apparatus of claim 15 wherein the plurality of drop generators are implemented in a laminar stack of metal plates.

* * * * *